United States Patent
Ben-Zicron

(10) Patent No.: US 8,114,322 B2
(45) Date of Patent: Feb. 14, 2012

(54) FRICTION MATERIAL AND METHOD FOR MAKING SAME

(76) Inventor: Lilo Ben-Zicron, West Toluca Lake, CA (US)

(*) Notice: Subject to any disclaimer, the term of this patent is extended or adjusted under 35 U.S.C. 154(b) by 593 days.

(21) Appl. No.: 12/247,982

(22) Filed: Oct. 8, 2008

(65) Prior Publication Data

US 2010/0086776 A1    Apr. 8, 2010

(51) Int. Cl.
*B29C 43/18* (2006.01)
*B29C 43/20* (2006.01)

(52) U.S. Cl. .................. 264/113; 264/112; 264/115

(58) Field of Classification Search .................. None
See application file for complete search history.

(56) References Cited

U.S. PATENT DOCUMENTS

| | | | |
|---|---|---|---|
| 3,896,075 A * | 7/1975 | Longley | 523/153 |
| 4,384,054 A * | 5/1983 | Moraw et al. | 523/156 |
| 4,673,697 A | 6/1987 | Rowley | |
| 5,925,221 A | 7/1999 | Sayers et al. | |
| 6,647,747 B1 | 11/2003 | Brik | |
| 6,767,602 B1 | 7/2004 | Duval | |
| 7,223,708 B2 | 5/2007 | Beuzieron | |
| 7,370,738 B2 | 5/2008 | Vollweiter | |
| 2002/0153213 A1 | 10/2002 | Gruber | |
| 2004/0115439 A1 | 6/2004 | Degroote | |
| 2006/0162259 A1 * | 7/2006 | Ono et al. | 51/298 |
| 2006/0273484 A1 | 12/2006 | Beuzieron | |

* cited by examiner

*Primary Examiner* — Mary F Theisen
(74) *Attorney, Agent, or Firm* — Kenneth L. Green

(57) ABSTRACT

An improved friction material includes inorganic fibers formed from a melt of volcanic black rock and additives. The black rock comprises silica oxide, magnesium oxide, potassium permanganate, aluminum oxide, iron oxide, silicon dioxide, titanium dioxide, sodium oxide, and boron. The additives include potassium permanganate and boron. As a result of their composition, the fibers are temperature resistant and lightweight, yet strong. The fibers exhibit a melting point between 1500 degrees centigrade and 1650 degrees centigrade, a working range of −130 degrees centigrade to 700 degrees centigrade, a density of 1.8 g/cc, a surface density between 160 $g/m^2$ and 350 $g/m^2$, and a tensile strength between 500 $lbf/in^2$ and 1800 $lbf/in^2$. The friction material is made from layers of the inorganic fibers and a bonding material and has a working temperature between 250 degrees centigrade and 650 degrees centigrade, with a melting point of approximately 1200 degrees centigrade.

20 Claims, 3 Drawing Sheets

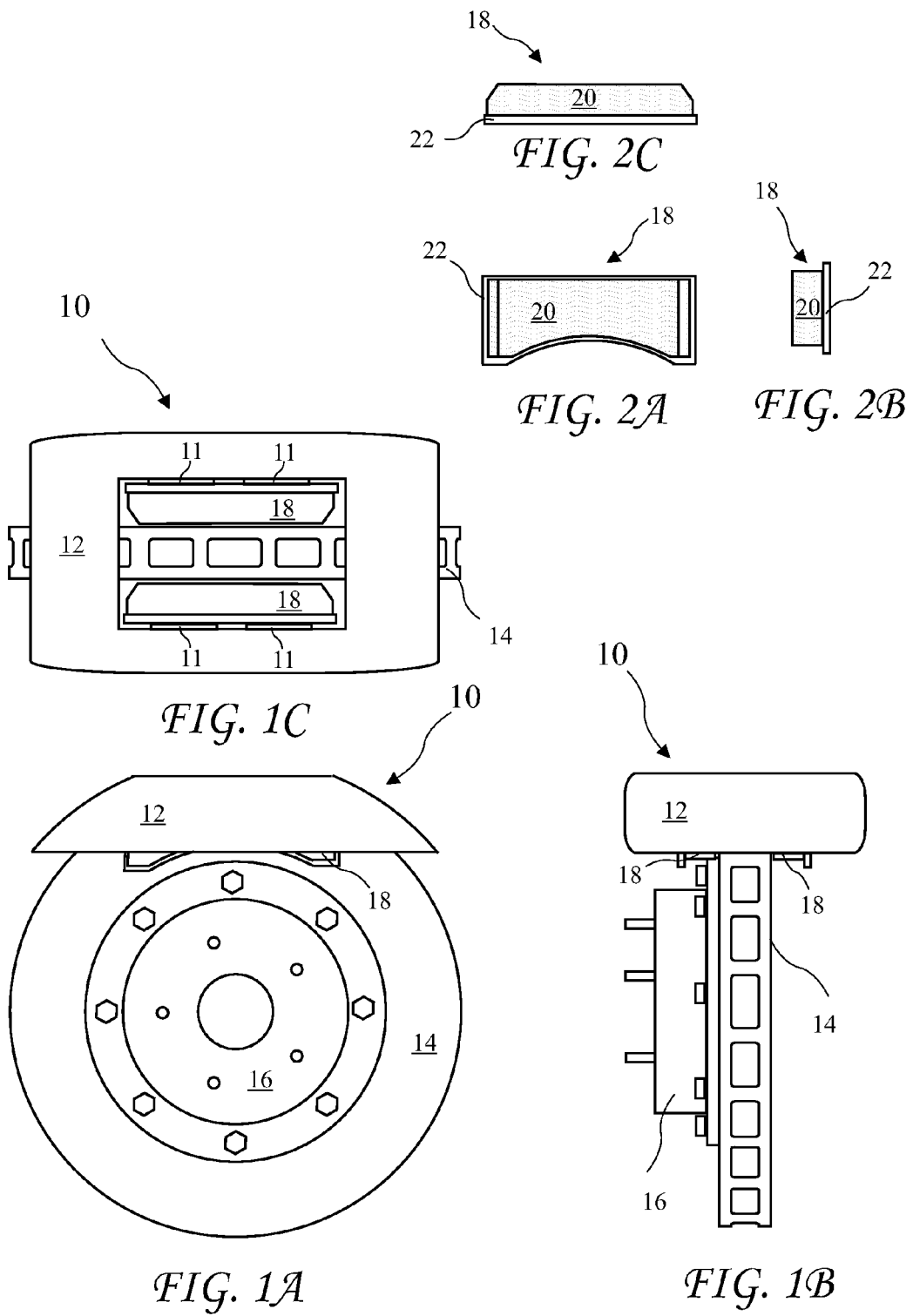

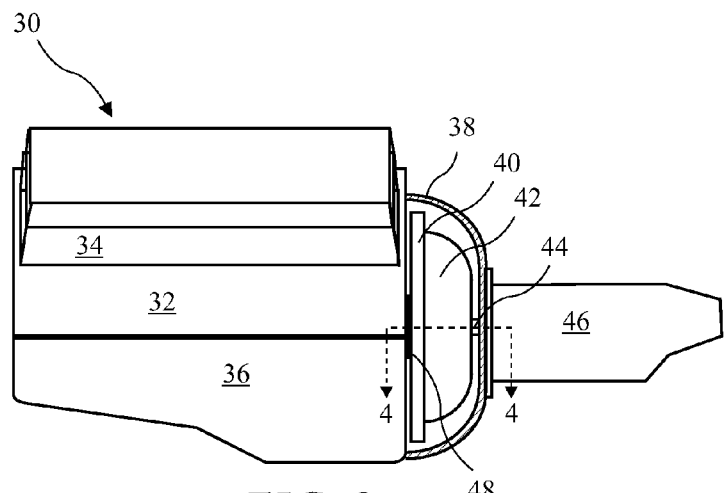
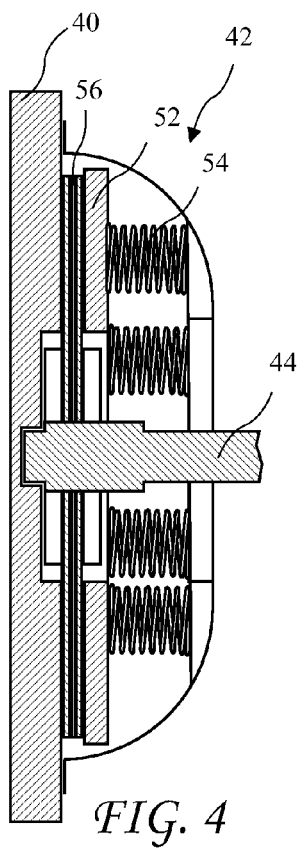
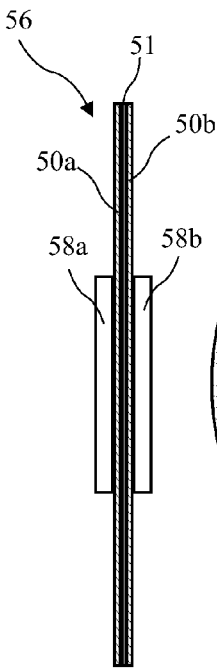
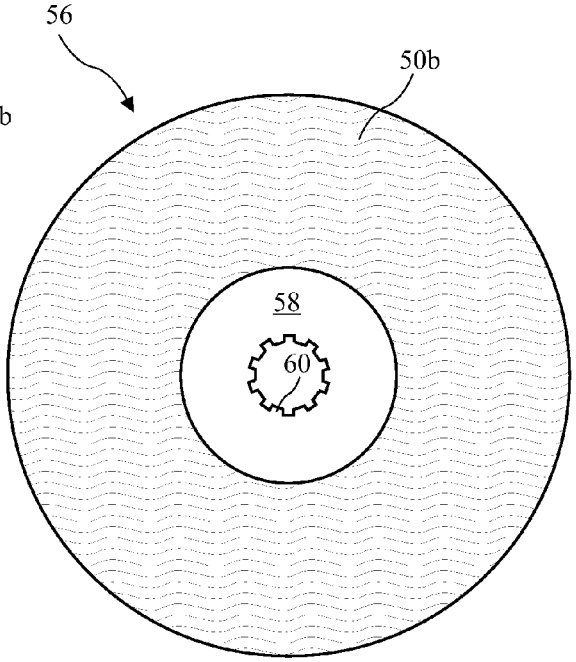
FIG. 3
FIG. 4   FIG. 5A   FIG. 5B

FRICTION MATERIAL AND METHOD FOR MAKING SAME

BACKGROUND OF THE INVENTION

The present invention relates to friction material and in particular to a friction material made from volcanic black rock and used in brake and clutch systems and similar applications.

Known vehicles require means for reducing linear velocity and momentum and means for reducing angular velocity and momentum of rotating members carrying the vehicles. Mechanical friction brakes are commonly used for such purposes and known brakes are suitable for typical vehicles operated at moderate speeds and loads in flat terrain. Such friction brakes work by converting kinetic energy into heat energy, and the greater the speed or mass of the moving vehicle, the greater the amount of heat generated to slow or stop the vehicle. The friction is generally created by forcing a friction material against a rotating surface. When vehicles are operated at high speeds with frequent braking, with heavy cargo creating greater linear momentum, or on long down hill stretches of road, the friction material may overheat and either fail or fade. Such loss of braking creates a severe risk of accidents. Although disk brakes have greatly improved braking performance over older drum brakes, there remains a need to further improve friction material used in vehicle brakes for both commercial and racing applications.

Many applications also require coupling and decoupling rotating members initially rotating at different angular speeds. The different angular speeds of the rotating members generally must first be synchronized before final coupling is achieved, and in the case of a manual transmission vehicle, motion is initiated from a stop by briefly slipping a clutch before fully engaging. In known vehicles, the clutch couples an engine flywheel to a transmission input shaft. Commonly, a clutch pressure plate is rotationally fixed to the flywheel and a clutch disk(s) with friction material on two opposite sides is sandwiched between the pressure plate and the flywheel. The clutch disk includes an inside spline which engages the transmission input shaft. The pressure plate includes an axially moving plate and spring(s) which push the plate against the clutch disk. The amount of torque transmittable through the clutch is proportional to the force applied on the plate by the springs, and in some instances, by weights and effects of centrifugal force. When the vehicle makes a standing start, the clutch slippage creates heat which may damage the friction material and result in continuous clutch slippage while driving. Because of the clutch slippage issue, clutches in high performance applications remain a weak link between the engine and transmission and a need remains for an improved friction material.

BRIEF SUMMARY OF THE INVENTION

The present invention addresses the above and other needs by providing an improved friction material which includes inorganic fibers. The inorganic fibers are formed from a melt of volcanic black rock and additives. The black rock is comprised of silica oxide, magnesium oxide, potassium permanganate, aluminum oxide, iron oxide, silicon dioxide, titanium dioxide, sodium oxide, and boron. The additives include potassium permanganate and boron. As a result of their composition, the fibers are temperature resistant and lightweight, yet strong. The fibers exhibit a melting point between 1500 degrees centigrade and 1650 degrees centigrade, a working range of −130 degrees centigrade to 700 degrees centigrade, a density of 1.8 g/cc, a surface density between 160 g/m$^2$ and 350 g/m$^2$, and a tensile strength between 500 lbf/in$^2$ and 1800 lbf/in$^2$. The friction material is made from layers of the inorganic fibers and a bonding material and has a working temperature between 250 degrees centigrade and 650 degrees centigrade, with a melting point of approximately 1200 degrees centigrade.

In accordance with one aspect of the invention, there is provided a low cost friction material made from a raw mixture of low cost volcanic black rock and additives. The raw mixture is comprised of approximately 55 to 60 percent by weight silica oxide, approximately eight to ten percent by weight magnesium oxide, approximately five to ten percent by weight potassium permanganate, less than approximately fifteen percent by weight aluminum oxide, approximately two to five percent by weight iron oxide, less than approximately two percent by weight silicon dioxide, less than approximately five percent by weight titanium dioxide, less than approximately two percent by weight sodium oxide, less than approximately two percent by weight boron, and approximately one to five percent by weight rayon. More preferably, the raw mixture is comprised of approximately 55 percent by weight silica oxide, approximately nine percent by weight magnesium oxide, approximately 8.4 percent by weight potassium permanganate, approximately 13.2 percent by weight aluminum oxide, approximately 3.5 percent by weight iron oxide, approximately 0.85 percent by weight silicon dioxide, approximately 3.5 percent by weight titanium dioxide, approximately 0.8 percent by weight sodium oxide, approximately two percent by weight boron, and approximately four percent by weight rayon.

In accordance with another aspect of the invention, there is provided a low cost friction material made from a raw mixture of low cost volcanic black rock and additives. The raw mixture consists essentially of approximately 55 to 60 percent by weight silica oxide, approximately eight to ten percent by weight magnesium oxide, approximately five to ten percent by weight potassium permanganate, less than approximately fifteen percent by weight aluminum oxide, approximately two to five percent by weight iron oxide, and approximately one to five percent by weight rayon.

In accordance with yet another aspect of the invention, there is provided a low cost friction material made from a raw mixture of low cost volcanic black rock and an additive. The additive is comprised of includes about 26 to 33 percent by weight potassium permanganate, about 39 to 45 percent by weight iron oxide, about 22 to 31 percent by weight whitestone and about three percent by weight boron. The potassium permanganate is provided as a fuel source for melting the raw materials 26 and the iron oxide is provided to modify the black rock 74.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1A is a side view of a disk brake assembly including brake pads having friction material according to the present invention.

FIG. 1B is a front view of the disk brake assembly including brake pads having friction material according to the present invention.

FIG. 1C is a top view of the disk brake assembly including brake pads having friction material according to the present invention.

FIG. 2A is a side view of a brake pad including a friction material according to the present invention.

FIG. 2B is a front view of the brake pad including a friction material according to the present invention.

FIG. 2C is a top view of the brake pad including a friction material according to the present invention.

FIG. 3 is a side view of an engine, flywheel and clutch assembly, and transmission including a clutch disk having the friction material according to the present invention.

FIG. 4 is a cross-sectional view of the clutch assembly taken along line 4-4 of FIG. 3.

FIG. 5A is a side view of the clutch disk including the friction material according to the present invention.

FIG. 5B is a front view of the clutch disk including the friction material according to the present invention.

Corresponding reference characters indicate corresponding components throughout the several views of the drawings.

DETAILED DESCRIPTION OF THE INVENTION

Figure 6:
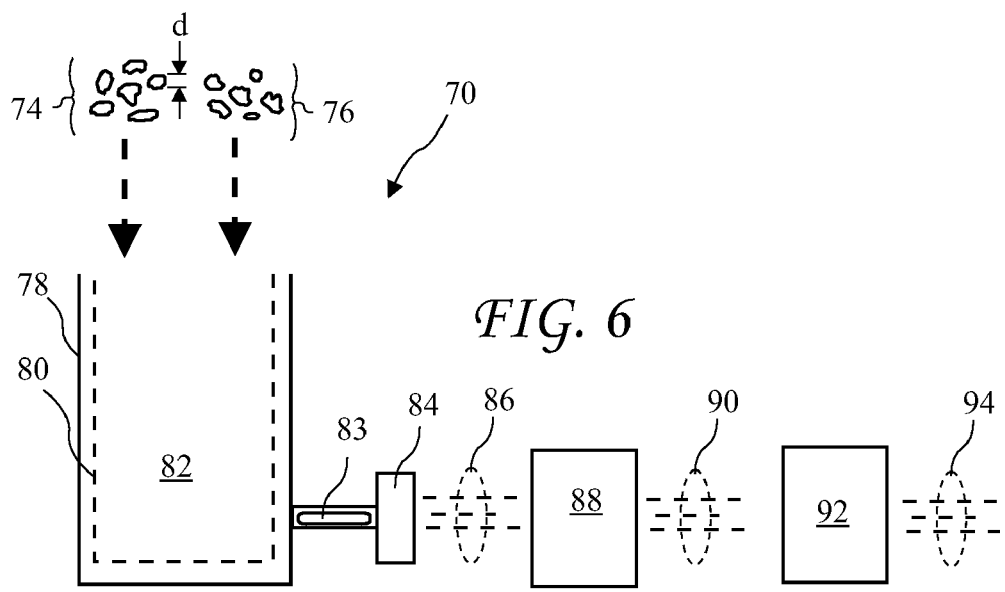
FIG. 6 is a schematic diagram exemplifying a method for manufacturing inorganic fibers used in the construction of the friction material according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A side view of a disk brake assembly 10 including brake pads 18 having friction material 20 according to the present invention is shown in FIG. 1A, a front view of the disk brake assembly 10 is shown in FIG. 1B, and a top view of the disk brake assembly 10 is shown in FIG. 1C. The disk brake assembly 10 includes a caliper 12 residing over a portion of a disk 14 and hat 16. The disk 14 and hat 16 are often separate pieces in high performance and racing brake assemblies, but are commonly a single piece in production cars. Two brake pads 18 reside inside the caliper 10 and are pushed together by pistons 11 to tightly sandwich the disk 14. The resulting drag between the brake pads 18 and the disk 14 converts kinetic energy in a moving vehicle into heat to slow the vehicle.

A side view of the brake pad 18 including a friction material 20 according to the present invention is shown in FIG. 2A, a front view of the brake pad 18 is shown in FIG. 2B, and a top view of the brake pad 18 is shown in FIG. 2C. The friction material 20 may be bonded, riveted, or otherwise attached to a backing plate 22. The backing plate is 22 is generally steel and is shaped to slide towards and away from the disk 14 inside the caliper 12. The friction material 20 according to the present invention is formed from inorganic fibers as described below.

While common vehicle brakes utilize disks 14 made from cast iron, many racing applications use disks made from ceramic composites (including carbon, KEVLAR® fiber, and silica), and the like. Such ceramic brakes include the Brembo Ceramic Brake Systems made by Brembo in Italy. Disks made from ceramic composites materials are much lighter than conventional cast iron disks. This light weight has major advantages of reducing unsprung weight, reducing angular momentum, and reducing gyroscopic effects. The friction material according to the present invention may be used to replace carbon fiber materials presently used and provide advantages such as lower cost and improved strength and durability. Carbon fiber materials are known to loose strength over time, the brake disks including the friction material according to the present invention provide better retention of the original mechanical properties. Such disks are described in U.S. Pat. No. 6,767,602, U.S. Pat. No. 7,370,738, and US Patent Application Publication No. 2002/0153213, which are incorporated herein by reference.

A side view of an engine 30, flywheel 40, clutch assembly 42, and transmission 46 is shown in FIG. 3. The engine 30 includes an engine block 32, head(s) 34, and oil pan 36. The flywheel 40 is bolted to an engine crankshaft 48 (only partially shown) and the clutch assembly 42 is bolted to the flywheel 40. A bell housing 38 (shown in a cross-sectional view) is bolted to the engine block 32, and a transmission 46 is bolted to the bell housing 38. A transmission input shaft 44 extends from the transmission 46 into the clutch assembly 42.

A cross-sectional view of the clutch assembly 42 taken along line 4-4 of FIG. 3 is shown in FIG. 4. The clutch assembly 42 includes an axially moving plate 52 pushed towards the flywheel 40 by springs 54. A clutch disk 56 is sandwiched between the axially moving plate 53 and the flywheel 40. The clutch disk 56 rides on the input shaft 44 and engages spline 60 (see FIG. 4B) to rotationally couple the clutch disk 56 to the input shaft 44. Friction between the two opposite faces of the clutch disk 56 and the faces flywheel 40 and the axially moving plate 53 couples the clutch disk to the engine and thereby couples the transmission 46 to the engine 30. Levers (not shown) residing inside a pressure plate assembly are generally actuated by a throwout bearing to lift the moving plate 52 away from the clutch disk 56 to disengage the clutch assembly 42.

A side view of the clutch disk 56 including the friction material 50a and 50b according to the present invention attached to opposite sides of a center plate 51, is shown in FIG. 5A and a front view of the clutch disk is shown in FIG. 5B. The friction material 50a and 50b is approximately the same diameter as the center plate 51 and attached to the center plate 51 by bonding, rivets, and the like. The friction material 50a and 50b and center plate 51 are sandwiched between hub halves 58a and 58b. The hub halves 58a and 58b have an inside spline 60 for axially slideably engaging cooperating spline on the input shaft 44. A known lever mechanism (or a diaphragm replacing both lever arms and the springs 54) not shown, engages the axially moving plate 53 to pull the axially moving plate 53 away from the clutch disk 56 to disengage the transmission 46 from the engine 30.

While the friction material 50a and 50b are shown as continuous washer shapes, the friction material may be broken into segments, or the clutch disk may have "paddles" with friction material on each paddle. Further, the friction materials 50a and 50b may be different friction materials, with one friction material made from inorganic fibers according to the present invention, and the other made from a different material to provide a dual friction clutch disk.

During partial engagement, the friction material 50a and 50b slips between the flywheel 40 and the axially moving plate 53. In particular, when the vehicle makes a standing start, the clutch slippage creates heat which may damage the friction material and result in continuous clutch slippage while driving. The friction material according to the present invention provides a strong, light, thermally stable allowing consistent performance in high performance applications. The inorganic fibers in the friction material provide a great benefit in heat dissipation and recover mechanical properties very quickly. The presence of the inorganic fibers according to the present invention in the friction material allows heat to dissipate quickly and, for example, the coefficient of friction of the friction material to be maintained.

A system 70 for manufacturing the inorganic fibers is shown in FIG. 6. As shown, the system 70 includes a furnace 78. The furnace 78 is preferably a cupola furnace and includes a chamber 82 formed by a sidewall 80. The chamber 82 is dimensioned to receive the raw materials needed to manufacture the inorganic fibers. Specifically, the raw materials include black rock 74 and an additive 76. As indicated, the black rock 74 and additive 76 are provided to the chamber 82 in the form of crushed solids. Once they are received in the chamber 82, they are liquefied therein to form a melt 83.

Downstream of the furnace 78, the system 70 includes an extruding device 84. The extruding device 84 may be integral with the furnace 78 or it may be connected directly to the furnace 78 for receiving the melt 83. Alternatively, the melt 83 may be delivered to the extruding device 84 via a carrier such as a ladle or the like. In either case, the extruding device 84 includes a pump or other means to force the melt 83 though an aperture, or several apertures, to form a plurality of inorganic fibers 86. Preferably, the apertures of the extruding device 84 are formed by a stationary platinum nozzle that can withstand the high temperatures of the melt 83.

As shown in FIG. 6, the system 70 further includes a cooling device 88 which is positioned downstream of the extruding device 84. Similar to the extruding device 84, the cooling device 88 may be integral with the furnace 78 or it may be connected thereto. As shown, the cooling device 88 is positioned to receive the plurality of fibers 86 from the extruding device 84. Further, a sizing station 92 is positioned downstream of the cooling device 88 to receive the plurality of cooled fibers 90 therefrom. The sizing station 92 includes a sizing agent which can be applied to the plurality of cooled fibers 90 to form a plurality of fibers 94.

In more detail, the black rock 74 of the present invention is preferably of the type of volcanic black rock that is commonly found in Oregon, Washington and other locations. Such black rock 74 typically contains about 55 to 60 percent by weight silica oxide, about 18 percent by weight magnesium oxide, about fifteen percent by weight potassium permanganate, about twelve percent by weight aluminum oxide, about two percent by weight iron oxide, about one percent by weight silicon dioxide, about two percent by weight titanium dioxide, and about one percent by weight sodium oxide. Unless treated or mixed with other materials, the black rock 74 typically has a melting point of over twelve hundred degrees centigrade (1200 degree C.). Before it is introduced to the chamber 82 of the furnace 78, the black rock 74 is preferably graded to individual pieces having diameters "d" of about four to eight inches. Preferably, the individual pieces of black rock 74 all have approximately the same diameter "d".

As further shown in FIG. 6, the additive 76 is provided in the form of crushed solids. The additive 76 preferably has a melting point of about 900 degrees centigrade and includes about 26 to 33 percent by weight potassium permanganate, about 39 to 45 percent by weight iron oxide, about 22 to 31 percent by weight whitestone and about three percent by weight boron. The potassium permanganate is provided as a fuel source for melting the raw materials 26 and the iron oxide is provided to modify the black rock 74. The boron and whitestone are provided to reduce the melting point and facilitate processing of the mixture of the raw materials. Whitestone contains about 58 percent by weight calcium oxide, about 41 percent by weight magnesium oxide, less than about one percent by weight silicon oxide, and less than about one percent by weight iron oxide, As a batch process, a desired amount of black rock 74 and additive 76 are delivered to the furnace 78. Preferably, the raw material provided to the chamber 82 consists essentially of 60 to 90 percent by weight black rock 74 and 10 to 40 percent by weight additive 76. In certain preferred embodiments, the raw material consists essentially of 87 to 88 percent by weight black rock 74 and 12 to 13 percent by weight additive 76. Volumetrically, the raw material is preferably about one hundred parts of black rock 74 and about fourteen parts of additive 76.

Because volcanic black rock is a natural product formed by a range of components, it is preferred that the additives are selected and the manufacturing process is controlled so that the raw material is preferably comprised of approximately 55 to 60 percent by weight silica oxide, approximately eight to ten percent by weight magnesium oxide, approximately five to ten percent by weight potassium permanganate, less than approximately fifteen percent by weight aluminum oxide, approximately two to five percent by weight iron oxide, less than approximately two percent by weight silicon dioxide, less than approximately five percent by weight titanium dioxide, less than approximately two percent by weight sodium oxide, less than approximately two percent by weight boron, and approximately one to five percent by weight rayon. More preferably, the raw material is comprised of approximately 55 percent by weight silica oxide, approximately nine percent by weight magnesium oxide, approximately 8.4 percent by weight potassium permanganate, approximately 13.2 percent by weight aluminum oxide, approximately 3.5 percent by weight iron oxide, approximately 0.85 percent by weight silicon dioxide, approximately 3.5 percent by weight titanium dioxide, approximately 0.8 percent by weight sodium oxide, approximately two percent by weight boron, and approximately four percent by weight rayon.

When deposited in the chamber 82 of the furnace 78, the mixture of raw materials is heated to a temperature in the range of approximately 955 degree C. to 1270 degrees centigrade, and preferably to between 1200 degrees centigrade and 1270 degrees centigrade. Regardless of the specific temperature attained, the mixture of raw materials is heated sufficiently to reduce the raw materials to liquefy to the melt 83 having a viscosity proper for processing. When the raw material is heated, the potassium permanganate is burned as a fuel and facilitates liquefying the other raw materials.

After the melt 83 is properly formed, it is delivered to the extruding device 84. The extruding device 84 extrudes the melt 83 into a plurality of hot fibers 86 by forcing the melt 83 through nozzles. The resulting fibers 86 have diameters up to fourteen microns and preferably in a range between seven and twelve microns. In order to prevent deformation of the fibers 86, they are delivered to the cooling device 88 to be cooled and hardened to a soft solid state. During the cooling process, the cooling device 88 first cools the plurality of fibers 86 to about 800 degrees centigrade and maintains that temperature for about 30 minutes. Then it cools the plurality of fibers 86 to about 355 degrees centigrade and maintains that temperature for about 30 minutes. As a result, the plurality of fibers 86 reaches a substantially soft solid state that facilitates further processing.

After the fibers are extruded from the melt, they are sized or coated with a rayon sizing agent. Preferably, the resulting fibers have a diameter in a range of seven to fourteen microns and more preferably seven to twelve microns and is approximately 95 to 99 percent by weight inorganic filaments and approximately one to five percent by weight rayon, and more preferably approximately 98 percent by weight inorganic filaments and approximately four percent by weight rayon.

Figure 7A:
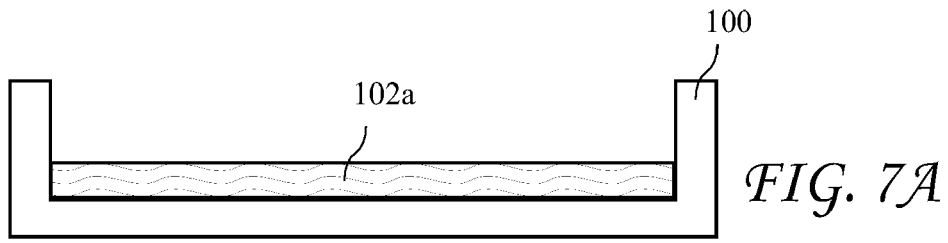
FIG. 7A depicts a first step in the manufacture of the friction material according to the present invention.
Figure 7B:
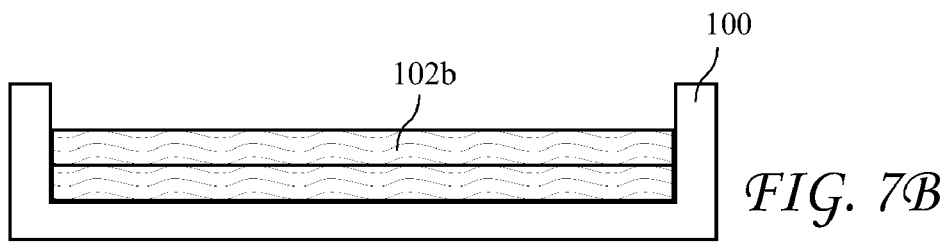
FIG. 7B depicts a second step in the manufacture of the friction material according to the present invention.
Figure 7C:
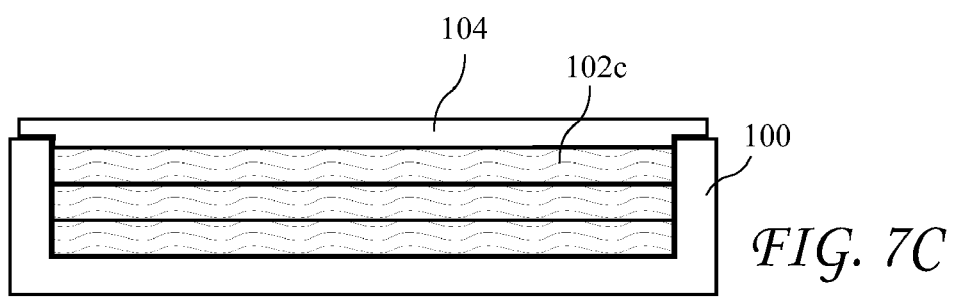
FIG. 7C depicts a third step in the manufacture of the friction material according to the present invention.

Steps in the manufacture of the friction material according to the present invention are depicted in FIGS. 7A-7C. The friction material is preferably formed in a multiple layer process to allow certain gases to escape and allows a better curing process of each layer. In FIG. 7A a first layer 102a of the friction material comprising a mixture of the inorganic fibers according to the present invention at least between 0.5 and one inches long, and resin, is laid in a lay-up plate 100. The first layer 102a is set under of about 400 Pounds per Square Inch (PSI) and cured at between 275 degrees centigrade and 350 degrees centigrade in an autoclave.

In FIG. 7B a second layer 102b of the friction material comprising a mixture of the inorganic fibers between 0.5 and one inches long and an organic binding agent (phenolic) is laid in the lay-up plate 100 on top of the first layer 102a. The second layer 102b is also set under of about 400 PSI and cured at between 275 degrees centigrade and 350 degrees centigrade in an autoclave.

In FIG. 7C a third layer 102c of the friction material comprising a mixture of the inorganic fibers at least between 0.5 and one inches long and resin (an organic binding agent, for example, phenolic) is laid in the lay-up plate 100 on top of the second layer 102b and an optional plate 104 may be laid over the third layer 102c. The third layer 102c and plate 104 are set under of about 250 PSI and cured at about 300 degrees centigrade in an autoclave. The plate 104 may be a backing plate 22 for a brake pad 18 (see FIGS. 2A-2C). The thickness of the third layer 102c may vary depending on the application (e.g., brake pads, clutch disks, or disk brake rotors).

The thickness of each layer 102a-102c depends on the application and purpose. Each layer 102a-102c increases the thermal insulation properties of the friction material, so that in a brake pad application, the heat generated by braking will not transfer to the brake calipers pistons and therefore into the brake fluid. Forming the friction material from layers using the multiple layer process with each layer at the most approximately ⅜ inches thick is preferable, and allows certain gases to escape and allows a better curing process.

Because of the high temperatures experienced by friction material, phenolics and other high temp systems, including newly developed sugar based resins are preferred bonding materials. Following laying up the three layers 102a, 102b, 102c, and optionally the plate 104, the friction material is cured at about 300 degrees centigrade and about 250 PSI. The curing is preferably performed in an autoclave. The resulting friction material has a working temperature between 250 degrees centigrade and 650 degrees centigrade, with a melting point of approximately 1200 degrees centigrade. The curing step stabilizes the friction material similar to a heat treat.

While friction material used in vehicle brakes and clutches was described above and applications of the friction material according to the present invention, any application of the friction material according to the present invention is intended to come within the scope of the present invention.

While the invention herein disclosed has been described by means of specific embodiments and applications thereof, numerous modifications and variations could be made thereto by those skilled in the art without departing from the scope of the invention set forth in the claims.

I claim:

1. A method for manufacturing a friction material, the method comprising:
    mixing a volcanic black rock with an additive to prepare a raw material, wherein the additive includes potassium permanganate, iron oxide, and whitestone;
    melting the raw material to create a melt;
    forming inorganic fibers from the melt, the fibers between seven and fourteen microns in diameter;
    cooling the inorganic fibers;
    mixing the inorganic fibers with a binding agent;
    filling a mold with the mixture of the inorganic fibers and the binding agent; and
    curing the mixture to form the friction material comprising:
        laying up a first layer of the friction material comprising a mixture of the inorganic fibers at least between 0.5 and one inches long, and resin in a lay-up plate;
        setting the first layer at about 400 Pounds per Square Inch (PSI) and curing the first layer at between 275 degrees centigrade and 350 degrees centigrade in an autoclave; and
        setting up a second layer under of about 400 PSI and curing the second layer at between 275 degrees centigrade and 350 degrees centigrade in an autoclave.

2. The method of claim 1, wherein mixing a volcanic black rock with an additive to prepare a raw material consists essentially of mixing approximately 60 to 90 percent by weight black rock with approximately 10 to 40 percent by weight additive.

3. The method of claim 1, wherein mixing a volcanic black rock with an additive to prepare a raw material comprises mixing a volcanic black rock with an additive including one to five percent by weight rayon.

4. The method of claim 1, wherein mixing a volcanic black rock with an additive to prepare a raw material comprises mixing a volcanic black rock with an additive comprising:
    between 26 and 33 percent by weight potassium permanganate;
    between 39 and 45 percent by weight iron oxide;
    between 22 and 31 percent by weight whitestone; and
    approximately three percent by weight boron.

5. The method of claim 1, further including attaching the friction material to a backing plate to make a brake pad.

6. The method of claim 1, further including attaching the friction material to at least one side of a center plate to make a clutch disk.

7. The method of claim 1, further including forming a disk brake rotor from the friction material.

8. The method of claim 1, further including setting up a third layer under of about 250 PSI and curing at about 300 degrees centigrade in an autoclave.

9. The method of claim 8, further including laying a plate over the third layer prior to setting the third layer and setting up the third layer and plate at about 250 PSI and curing at about 300 degrees centigrade in an autoclave.

10. The method of claim 9, further including following laying up the three layers and the plate, curing the three layers and the plate at about 300 degrees centigrade and about 250 PSI.

11. The method of claim 8, further including following laying up the three layers, curing the friction material at about 300 degrees centigrade and about 250 PSI.

12. The method of claim 11, further including laying up each layer at the most approximately ⅜ inches thick.

13. A method for manufacturing a brake pad, the method comprising:
- mixing a volcanic black rock with an additive to prepare a raw material, wherein the raw material consisting essentially of approximately:
  - between 55 and 60 percent by weight silica oxide;
  - between eight and ten percent by weight magnesium oxide;
  - between five and ten percent by weight potassium permanganate;
  - less than fifteen percent by weight aluminum oxide;
  - between two and five percent by weight iron oxide; and
  - between one and five percent by weight rayon;
- melting the raw material to create a melt;
- forming inorganic fibers from the melt;
- cooling the inorganic fibers;
- mixing the inorganic fibers with a binding agent;
- partially filling a mold with the mixture of the inorganic fibers with and a binding agent to form a first layer no thicker than approximately ⅜ inches to allow gasses to escape during curing;
- curing the first layer;
- continuing partially filling a mold with the mixture of the inorganic fibers with and the binding agent over the first layer to form a second layer no thicker than approximately ⅜ inches to allow gasses to escape during curing;
- curing the second layer;
- continuing partially filling a mold with the mixture of the inorganic fibers with and the binding agent over the second layer to form a third layer;
- curing the third layer;
- performing final curing of the three layers to form the friction material; and
- bonding a backing plate to the friction material to form the brake pad.

14. The method of claim 13, wherein the binding agent is selected from the group consisting of phenolics and sugar based resins.

15. The method of claim 13, wherein the binding agent is a phenolics resin.

16. The method of claim 13, wherein the friction material is cured at about 300 degrees centigrade and about 250 PSI.

17. The method of claim 13, wherein the friction material is laid up from inorganic fibers are between 0.5 and one inches long.

18. A method for manufacturing a friction material, the method comprising:
- mixing a volcanic black rock with an additive to prepare a raw material, wherein the additive includes potassium permanganate, iron oxide, and whitestone;
- melting the raw material to create a melt;
- forming inorganic fibers from the melt;
- cooling the inorganic fibers;
- mixing the inorganic fibers with a binding agent;
- partially filling a mold with the mixture of the inorganic fibers with and a binding agent to form a first layer;
- curing the first layer;
- continuing partially filling a mold with the mixture of the inorganic fibers with and the binding agent over the first layer to form a second layer;
- curing the second layer;
- performing final curing of the two layers to form the friction material; and
- bonding a backing plate to the friction material to form a friction material.

19. The method of claim 18, further including setting the layers at about 400 Pounds per Square Inch (PSI).

20. The method of claim 18 further including a curing the layers at between 275 degrees centigrade and 350 degrees centigrade in an autoclave.

* * * * *